(12) United States Patent
Rao et al.

(10) Patent No.: US 8,799,485 B2
(45) Date of Patent: *Aug. 5, 2014

(54) METHODS AND APPARATUS FOR ESTABLISHING NETWORK CONNECTIONS USING AN INTER-MEDIATING DEVICE

(75) Inventors: Padmanabha R. Rao, Palo Alto, CA (US); Vikram Dham, Fremont, CA (US)

(73) Assignee: Sling Media, Inc., Foster City, CA (US)

( * ) Notice: Subject to any disclaimer, the term of this patent is extended or adjusted under 35 U.S.C. 154(b) by 814 days.

This patent is subject to a terminal disclaimer.

(21) Appl. No.: 12/642,368

(22) Filed: Dec. 18, 2009

(65) Prior Publication Data

US 2011/0153845 A1 Jun. 23, 2011

(51) Int. Cl.
*G06F 15/16* (2006.01)
*H04L 12/44* (2006.01)

(52) U.S. Cl.
CPC .................................. *H04L 12/44* (2013.01)
USPC .......................................... 709/228; 709/231

(58) Field of Classification Search
USPC ........................................................ 709/228
See application file for complete search history.

(56) References Cited

U.S. PATENT DOCUMENTS

| | | | |
|---|---|---|---|
| 3,416,043 A | 12/1968 | Jorgensen |
| 4,254,303 A | 3/1981 | Takizawa |
| 5,161,021 A | 11/1992 | Tsai |
| 5,237,648 A | 8/1993 | Mills et al. |
| 5,386,493 A | 1/1995 | Degen et al. |
| 5,434,590 A | 7/1995 | Dinwiddie, Jr. et al. |
| 5,493,638 A | 2/1996 | Hooper et al. |
| 5,602,589 A | 2/1997 | Vishwanath et al. |
| 5,661,516 A | 8/1997 | Carles |
| 5,666,426 A | 9/1997 | Helms |
| 5,682,195 A | 10/1997 | Hendricks et al. |
| 5,706,290 A | 1/1998 | Shaw et al. |
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |

(Continued)

FOREIGN PATENT DOCUMENTS

| | | |
|---|---|---|
| CN | 1464685 | 12/2003 |
| DE | 4407319 A1 | 9/1994 |

(Continued)

OTHER PUBLICATIONS

China State Intellectual Property Office "First Office Action," issued Jan. 8, 2010, for Application No. 200810126554.0.

(Continued)

*Primary Examiner* — Tauqir Hussain
(74) *Attorney, Agent, or Firm* — Ingrassias Fisher & Lorenz, P.C.

(57) ABSTRACT

Systems and methods are provided to facilitate communication between a first device and a second device on a network. A first wireless communication session is established between the first device and a remote control or other inter-mediating device. A network address used by the first device to communicate on the network is received from the first device via the first wireless communication session. A second wireless communication session is established between the intermediating device and a second device, and the first address is provided to the second device via the second wireless communication session.

18 Claims, 2 Drawing Sheets

(56) References Cited

U.S. PATENT DOCUMENTS

| | | |
|---|---|---|
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,565,681 B2 | 7/2009 | Ngo et al. |
| 8,626,879 B2 | 1/2014 | Dham et al. |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0055983 A1 | 5/2002 | Goddard |
| 2002/0080753 A1 | 6/2002 | Lee |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0116475 A1 | 8/2002 | Berg |
| 2002/0122137 A1 | 9/2002 | Chen et al. |
| 2002/0131497 A1 | 9/2002 | Jang |
| 2002/0138843 A1 | 9/2002 | Samaan et al. |

(56) References Cited

U.S. PATENT DOCUMENTS

| | | |
|---|---|---|
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2003/0001880 A1 | 1/2003 | Holtz et al. |
| 2003/0028873 A1 | 2/2003 | Lemmons |
| 2003/0065915 A1 | 4/2003 | Yu et al. |
| 2003/0093260 A1 | 5/2003 | Dagtas et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0208612 A1 | 11/2003 | Harris et al. |
| 2003/0231621 A1 | 12/2003 | Gubbi et al. |
| 2004/0003406 A1 | 1/2004 | Billmaier |
| 2004/0010510 A1 | 1/2004 | Hotti |
| 2004/0052216 A1 | 3/2004 | Roh |
| 2004/0068334 A1 | 4/2004 | Tsai et al. |
| 2004/0083301 A1 | 4/2004 | Murase et al. |
| 2004/0100486 A1 | 5/2004 | Flamini et al. |
| 2004/0103340 A1 | 5/2004 | Sundareson et al. |
| 2004/0139047 A1 | 7/2004 | Rechsteiner et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0205830 A1 | 10/2004 | Kaneko |
| 2004/0212640 A1 | 10/2004 | Mann et al. |
| 2004/0216173 A1 | 10/2004 | Horoszowski et al. |
| 2004/0236844 A1 | 11/2004 | Kocherlakota |
| 2004/0255249 A1 | 12/2004 | Chang et al. |
| 2005/0021398 A1 | 1/2005 | McCleskey et al. |
| 2005/0027821 A1 | 2/2005 | Alexander et al. |
| 2005/0038981 A1 | 2/2005 | Connor et al. |
| 2005/0044058 A1 | 2/2005 | Matthews et al. |
| 2005/0050462 A1 | 3/2005 | Whittle et al. |
| 2005/0053356 A1 | 3/2005 | Mate et al. |
| 2005/0055595 A1 | 3/2005 | Frazer et al. |
| 2005/0060759 A1 | 3/2005 | Rowe et al. |
| 2005/0097542 A1 | 5/2005 | Lee |
| 2005/0114852 A1 | 5/2005 | Chen et al. |
| 2005/0132351 A1 | 6/2005 | Randall et al. |
| 2005/0138560 A1 | 6/2005 | Lee et al. |
| 2005/0198584 A1 | 9/2005 | Matthews et al. |
| 2005/0204046 A1 | 9/2005 | Watanabe |
| 2005/0216851 A1 | 9/2005 | Hull et al. |
| 2005/0227621 A1* | 10/2005 | Katoh ........................... 455/41.2 |
| 2005/0229118 A1 | 10/2005 | Chiu et al. |
| 2005/0246369 A1 | 11/2005 | Oreizy et al. |
| 2005/0251833 A1 | 11/2005 | Schedivy |
| 2005/0283791 A1 | 12/2005 | McCarthy et al. |
| 2005/0288999 A1 | 12/2005 | Lerner et al. |
| 2006/0011371 A1 | 1/2006 | Fahey |
| 2006/0031381 A1 | 2/2006 | Van Luijt et al. |
| 2006/0050970 A1 | 3/2006 | Gunatilake |
| 2006/0051055 A1 | 3/2006 | Ohkawa |
| 2006/0085579 A1* | 4/2006 | Sato ............................... 710/73 |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | Van Beek |
| 2006/0095943 A1 | 5/2006 | Demircin et al. |
| 2006/0107226 A1 | 5/2006 | Matthews et al. |
| 2006/0117371 A1 | 6/2006 | Margulis |
| 2006/0126619 A1 | 6/2006 | Teisberg et al. |
| 2006/0129676 A1 | 6/2006 | Modi et al. |
| 2006/0146174 A1 | 7/2006 | Hagino |
| 2006/0224719 A1 | 10/2006 | Eswaran et al. |
| 2006/0280157 A1 | 12/2006 | Karaoguz et al. |
| 2007/0003224 A1 | 1/2007 | Krikorian et al. |
| 2007/0005783 A1 | 1/2007 | Saint-Hillaire et al. |
| 2007/0022328 A1 | 1/2007 | Tarra et al. |
| 2007/0074115 A1 | 3/2007 | Patten et al. |
| 2007/0076604 A1 | 4/2007 | Litwack |
| 2007/0157303 A1* | 7/2007 | Pankratov ........................ 726/11 |
| 2007/0168543 A1 | 7/2007 | Krikorian et al. |
| 2007/0180485 A1 | 8/2007 | Dua |
| 2007/0198532 A1 | 8/2007 | Krikorian et al. |
| 2007/0234213 A1 | 10/2007 | Krikorian et al. |
| 2007/0258718 A1* | 11/2007 | Furlong et al. ................. 398/106 |
| 2007/0286596 A1 | 12/2007 | Lonn |
| 2008/0019276 A1 | 1/2008 | Takatsuji et al. |
| 2008/0037573 A1 | 2/2008 | Cohen |
| 2008/0040446 A1 | 2/2008 | Meyer |
| 2008/0059533 A1 | 3/2008 | Krikorian |
| 2008/0134267 A1 | 6/2008 | Moghe et al. |
| 2008/0195744 A1 | 8/2008 | Bowra et al. |
| 2008/0199150 A1 | 8/2008 | Candelore |
| 2008/0294759 A1 | 11/2008 | Biswas et al. |
| 2008/0307456 A1 | 12/2008 | Beetcher et al. |
| 2008/0307462 A1 | 12/2008 | Beetcher et al. |
| 2008/0307463 A1 | 12/2008 | Beetcher et al. |
| 2009/0074380 A1 | 3/2009 | Boston et al. |
| 2009/0199248 A1 | 8/2009 | Ngo et al. |
| 2009/0265541 A1 | 10/2009 | Ylitalo et al. |
| 2010/0011116 A1 | 1/2010 | Thornton et al. |
| 2010/0083312 A1* | 4/2010 | White et al. ..................... 725/39 |
| 2010/0100915 A1 | 4/2010 | Krikorian et al. |
| 2010/0268832 A1 | 10/2010 | Lucas et al. |

FOREIGN PATENT DOCUMENTS

| | | |
|---|---|---|
| EP | 0838945 A | 4/1998 |
| EP | 1077407 A1 | 2/2001 |
| EP | 1443766 A2 | 8/2004 |
| EP | 1691550 A | 8/2006 |
| EP | 1830558 A1 | 9/2007 |
| GB | 2307151 A | 5/1997 |
| JP | 2003046582 A | 2/2003 |
| JP | 2004015111 A | 1/2004 |
| KR | 19990082855 A | 11/1999 |
| KR | 20010211410 A | 8/2001 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 20060744110 A | 7/2006 |
| WO | 2007027891 A2 | 3/2007 |
| WO | 2007051156 A2 | 5/2007 |
| WO | 2007141555 A2 | 12/2007 |
| WO | 2007149466 A2 | 12/2007 |
| WO | 2008024723 A | 2/2008 |

OTHER PUBLICATIONS

USPTO Final Office action mailed Jan. 25, 2010; U.S. Appl. No. 11/734,277, filed Apr. 12, 2007.

Gurzhi, Alexander et al. "Systems and Methods for Emulation Network-Enabled Media Components," U.S. Appl. No. 12/711,830, filed Feb. 24, 2010.

Jain, Vikal Kumar "Systems and Methods for Coordinating Data Communication Between Two Device," U.S. Appl. No. 12/699,280, filed Feb. 3, 2010.

"The Authoritative Dictionary of IEEE Standard Terms," 7th ed. 2000.

Newton's Telcom Dictionary, 20th ed., Mar. 2004.

USPTO Final Office Action mailed Mar. 3, 2010; U.S. Appl. No. 11/111,265, filed Apr. 21, 2005.

USPTO Final Office Action mailed Mar. 12, 2010; U.S. Appl. No. 11/620,711, filed Jan. 7, 2007.

European Patent Office, International Searching Authority, "International Search Report," mailed Mar. 30, 2010; International Application PCT/US2009/068468 filed Dec. 27, 2009.

USPTO Non-Final Office Action mailed Mar. 19, 2010; U.S. Appl. No. 11/147,664, filed Jun. 7, 2005.

(56) References Cited

OTHER PUBLICATIONS

USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
International Search Report and Written Opinion for International Application No. PCT/US2006/025911, mailed Jan. 3, 2007.
International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US2006/025912, mailed Jul. 17, 2008.
International Search Report for International Application No. PCT/US2008/059613, mailed Jul. 21, 2008.
International Search Report and Written Opinion for International Application No. PCT/US2008/080910, mailed Feb. 16, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control—Controlling-Your-Computer-With-a-Remote/?highlight=remote+control>; retrieved on Jan. 28, 2009.
Sling Media Inc. "Slingbox User Guide" [Online] 2006, XP002512553; retrieved from the Internet: <URL:http://www.slingmedia.hk/attach/en-US_SlingboxUS_UserUS_GuideUS_v12.pdf>; retrieved on Jan. 29, 2009.
Sony Corporation "LocationFree TV" [Online], 2004, SP002512410; retrieved from the Internet: <URL:http://www.docs.sony.com/release/LFX1US_X5revision.pdf>; retrieved on Jan. 28, 2009 [note—document uploaded in two parts as file exceeds the 25MB size limit].
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.
China State Intellectual Property Office "Office Action" issued Mar. 18, 2010 for Application No. 200680022520.6.
China State Intellectual Property Office "Office Action" issued Apr. 13, 2010 for Application No. 200580026825.X.
Canadian Intellectual Property Office "Office Action" mailed Feb. 18, 2010 for Application No. 2569610.
European Patent Office "European Search Report," mailed May 7, 2010 for Application No. 06786174.0.
Margulis, Neal "Apparatus and Method for Effectively Implementing a Wireless Television System," U.S. Appl. No. 12/758,193, filed Apr. 12, 2010.
Margulis, Neal "Apparatus and Method for Effectively Implementing a Wireless Television System," U.S. Appl. No. 12/758,194, filed Apr. 12, 2010.
Margulis, Neal "Apparatus and Method for Effectively Implementing a Wireless Television System," U.S. Appl. No. 12/758,196, filed Apr. 12, 2010.
Kirkorian, Jason Gary et al. "Personal Media Broadcasting System with Output Buffer," U.S. Appl. No. 12/757,697, filed Apr. 9, 2010.
Tarra, Raghuveer et al. "Firmware Update for Consumer Electronic Device," U.S. Appl. No. 12/757,714, filed Apr. 9, 2010.

USPTO "Final Office Action" mailed Nov. 21, 2011; U.S. Appl. No. 12/644,918, filed Dec. 22, 2009.
European Patent Office, European Search Report for European Application No. EP 08 16 7880, mailed Mar. 4, 2009.
MythTV Wiki, "MythTV User Manual" [Online], Aug. 27, 2007, XP002515046; retrieved from the Internet: <URL: http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [052], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809,868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.

(56) References Cited

OTHER PUBLICATIONS

USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast: Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
China State Intellectual Property Office "First Office Action," issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. Appl. No. 12/543,278, filed Aug. 18, 2009.
Malode, Deepak Ravi "Remote Control and Method for Automatically Adjusting the Volume Output of an Audio Device," U.S. Appl. No. 12/550,145, filed Aug. 28, 2009.
Akella, Aparna Sarma "Systems and Methods for Event Programming Via a Remote Media Player," U.S. Appl. No. 12/537,057, filed Aug. 6, 2009.
Shah, Bhupendra Natwerlan et al. "Systems and Methods for Transcoding and Place Shifting Media Content," U.S. Appl. No. 12/548,130, filed Aug. 26, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Nandury, Venkata Kishore "Adaptive Gain Control for Digital Audio Samples in a Media Stream," U.S. Appl. No. 12/507,971, filed Jul. 23, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Repoli," for International Application No. PCT/US2009/049006, mailed Sep. 11, 2009.
Conway, Frank et al. "Systems and Methods for Creating Variable Length Clips from a Media Stream," U.S. Appl. No. 12/347,465, filed Dec. 31, 2008.
Lucas, Brian et al. "Systems and Methods for Establishing Connections Between Devices Communicating Over a Network," U.S. Appl. No. 12/426,103, filed Apr. 17, 2009.

USPTO, Final Office Action, mailed Nov. 6, 2009; U.S. Appl. No. 09/809,868, filed Mar. 15, 2001.
Thiyagarajan, Venkatesan et al. "Always-On-Top Media Player Launched From a Web Browser," U.S. Appl. No. 12/617,271, filed Nov. 12, 2009.
Newton's Telecom Dictionary, 21st ed., Mar. 2005.
European Patent Office, European Search Report, mailed Sep. 28, 2009 for European Application No. EP 06 78 6175.
Paul, John Michael et al. "Systems and Methods for Delivering Messages Over a Network," U.S. Appl. No. 12/619,192, filed Nov. 16, 2009.
USPTO, Final Office Action mailed Nov. 12, 2009; U.S. Appl. No. 11/620,707, filed Jan. 7, 2007.
USPTO, Non-Final Office Action mailed Nov. 23, 2009; U.S. Appl. No. 11/683,862, filed Mar. 8, 2007.
International Search Report for PCT/US2008/069914 mailed Dec. 19, 2008.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
USPTO, Non-Final Office Action mailed Oct. 1, 2009; U.S. Appl. No. 11/778,287, filed Jul. 16, 2007.
USPTO Final Office Action mailed Dec. 30, 2009; U.S. Appl. No. 11/147,664, filed Jun. 7, 2005.
Dham, Vikram et al. "Systems and Methods for Establishing Network Connections Using Local Mediation Services," U.S. Appl. No. 12/644,918, filed Dec. 22, 2009.
Paul, John et al. "Systems and Methods for Remotely Controlling Media Server Via a Network," U.S. Appl. No. 12/645,870, filed Dec. 23, 2009.
PCT Partial International Search, PCT/US2009/054893, mailed Dec. 23, 2009.
Meyer, Derrick "MyReplayTV™ Creates First-Ever Online Portal to Personal TII Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
Asnis, Ilya et al. "Mediated Network address Translation Traversal" U.S. Appl. No. 12/405,039, filed Mar. 16, 2009.
Bajpal, Parimal et al. "Method and Node for Transmitting Data Over a Communication Network using Negative Ackhowledgement," U.S. Appl. No. 12/404,920, filed Mar. 16, 2009.
Bajpal, Parimal et al. "Method and Note for Employing Network connections Over a Connectinoless Transport Layer Protocol," U.S. Appl. No. 12/405,062, filed Mar. 16, 2009.
Australian Government "Office Action," Australian Patent Application No. 2006240518, mailed Nov. 12, 2009.
Srisuresh, P. et al. "Traditional IP Network Address Translator (Traditional NAT)," Network Working Group, the Internet Society, Jan. 2001.
Gangotri, Arun L. et al. "Systems, Methods, and Program Applications for Selectively Restricting the Placeshifting of Copy Protected Digital Media Content," U.S. Appl. No. 12/623,955, filed Nov. 23, 2009.
Paul, John et al. "Systems and Methods for Searching Media Content," U.S. Appl. No. 12/648,024, filed Dec. 28, 2009.
USPTO "Non-Final Office Action" mailed May 23, 2011; U.S. Appl. No. 12/644,918, filed Dec. 22, 2009.
Krikorian, Jason, U.S. Appl. No. 11/734,277, filed Apr. 12, 2007.
Tarra, Raghuveer et al., U.S. Appl. No. 60/975,239, filed Sep. 26, 2007.

(56) References Cited

OTHER PUBLICATIONS

Williams, George Edward, U.S. Appl. No. 12/167,041, filed Jul. 2, 2008.
Rao, Padmanabha R., U.S. Appl. No. 12/166,039, filed Jul. 1, 2008.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbri ck/document18/print>.
Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bininewtextversions.pl?storyid+1056825330084&3ate+2003/07/01&pagetype+printer§ion+1053801318705&path+articles/2003/06/30/0156825330084.html.]
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
Bajpai, Parimal et al. "Systems and Methods of Controlling the Encoding of a Media Stream," U.S. Appl. No. 12/339,878, filed Dec. 19, 2008.
Malone, Edward D. et al. "Systems and Methods for Controlling Media Devices," U.S. Appl. No. 12/256,344, filed Oct. 22, 2008.
Banger, Shashidhar et al. "Systems and Methods for Determining Attributes of Media Items Accessed Via a Personal Media Broadcaster," U.S. Appl. No. 12/334,959, filed Dec. 15, 2008.
Kulkarni, Anant Madhava "Systems and Methods for Creating Logical Media Streams for Media Storage and Playback," U.S. Appl. No. 12/323,907, filed Nov. 26, 2008.
Rao, Padmanabha R. "Systems and Methods for Linking Media Content," U.S. Appl. No. 12/359,784, filed Jan. 26, 2009.
Krikorian, Blake Gary et al. "Systems and Methods for Presenting Media Content Obtained From Multiple Sources," U.S. Appl. No. 12/408,456, filed Mar. 20, 2009.
Krikorian, Blake Gary et al. "Systems and Methods for Projecting Images From a Computer System," U.S. Appl. No. 12/408.460, filed Mar. 20, 2009.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
Japan Patent Office "Notice of Grounds for Rejection (Office Action)," mailed May 25, 2010; Patent Application No. 2007-0268269.
US Patent and Trademark Office, Notice of Allowance, dated Sep. 12, 2013 for U.S. Appl. No. 12/644,918.

* cited by examiner

METHODS AND APPARATUS FOR ESTABLISHING NETWORK CONNECTIONS USING AN INTER-MEDIATING DEVICE

TECHNICAL FIELD

The present disclosure generally relates to systems and methods for establishing connections between devices that are attempting to communicate over a network.

BACKGROUND

Many devices commonly found in homes, offices and other settings are able to communicate with other devices over local area, wide area and other networks. In addition to conventional computer systems, many different types of televisions, television receivers, audio/video components, video game players, home appliances and many other devices now communicate using digital networks.

This connectivity has enabled a new generation of applications and other benefits to consumers. Recently, for example, consumers have expressed significant interest in "place shifting" devices that allow remote viewing of television or other media content at locations other than the viewer's primary television set. Place shifting devices typically packetize and transmit media content over a network to a computer, phone or other remote device that can play back the packetized media stream for the viewer. In addition to placeshifting, many other media, control and other networked applications are enjoying similarly widespread consumer interest.

Challenges frequently arise, however, in establishing communications between networked devices, particularly if the communicating devices are not located on the same physical network as each other and/or if the transmitting device does not have a priori knowledge of the receiver's network address. To establish a media placeshifting session over a network, for example, a media player client typically contacts a content-providing server over the network to establish a streaming connection for the placeshifted media content. This can be a challenge if the client does not know where to find the server on the network. Similar issues can occur in establishing connections for video game players, audio/video components, home appliances and/or many other devices as well.

While various forms of mediation have been used to exchange address information and thereby establish connections between clients and servers on different networks, such services have exhibited a number of disadvantages. If the mediating service is provided on the Internet, for example, the service will typically be unavailable to environments where Internet connectivity is interrupted or unavailable for any reason. Further, as home and other networks become increasingly complicated, Internet-based mediation services may be unable to distinguish between addresses provided by clients and services that are located behind a common router or gateway, thereby limiting the usefulness of the service.

It is therefore desirable to create systems, devices and/or methods for reliably and conveniently establishing connections between clients and servers across a network. These and other desirable features and characteristics will become apparent from the subsequent detailed description and the appended claims, taken in conjunction with the accompanying drawings and this background section.

BRIEF SUMMARY

According to various exemplary embodiments, systems and methods are provided to facilitate communication between two devices on a network through the use of a remote control or other intermediating device.

In some embodiments, a method executable by an intermediating device is provided for facilitating communications between a first device and a second device over a network. The method suitably includes establishing a first wireless communication session between the first device and the intermediating device; receiving a message from the first device at the intermediating device, wherein the message has a payload specifying a first address, wherein the first address is a network address used by the first device to communicate on the network; establishing a second wireless communication session separate from the first wireless communication session between the intermediating device and a second device; and providing the first address from the intermediating device to the second device via the second wireless communication session.

Some embodiments provide a method executable by an intermediating device to facilitate communication between a client and a server on a network. The method suitably comprises establishing a first communication session between the remote control and the server via a wireless medium that is separate from the network, receiving a first address from the server at the remote control via the first wireless communication session, wherein the first address is a network address used by the server to communicate on the network, establishing a second wireless communication session between the remote control and the client via the wireless medium that is separate from the network, and providing the first address from the remote control to the client via the second wireless communication session to thereby allow the client to communicate with the server via the network.

Other embodiments provide an apparatus comprising a radio frequency interface and a processor. The processor is configured to establish a first wireless communication session with a first device via the radio frequency interface, to receive a message from the first device that comprises a payload specifying a network address used by the first device to communicate on the network, to establish a second wireless communication session with a second device via the radio frequency interface, and to provide the network address to the second device via the second wireless communication session.

Various embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various exemplary embodiments, systems and methods are provided to facilitate communication between two devices on a network through the use of a remote control or other intermediating device that is capable of communicating with each of the communicating device using radio frequency (RF) or other channels. In some implementations, the channels used to share address information between devices are not necessarily part of the network itself. The intermediating device may communicate, for example, using any ad hoc or other techniques, including ZIGBEE or other personal area network (PAN) techniques, BLUETOOTH, WI-FI, infrared and/or any other wireless connection techniques, as appropriate. The intermediating device is therefore able to obtain address information from a first device and to provide the address information to the second device so that the second device is able to contact the first device via the network.

As an example, a remote control that is used to control a set-top box or other television receiver could be enhanced to receive, store and transfer network address information. Such a remote may use PAN, WLAN, infrared or other techniques to establish communications with the receiver in a conventional manner. These communications could also be used to query or otherwise obtain the receiver's IP address, port number and/or other address information that the receiver uses to communicate on the network. After the information is stored in the remote control, the information may be transferred to another device. A network-enabled television or other display, for example, may use the address information associated with the television receiver to establish a media placeshifting session, to obtain files or data stored on the receiver, or for any other purpose. Equivalent embodiments may use different types of clients, servers, and intermediating devices other than those described in this example to establish network communications for any purpose.

Although discussion often refers to placeshifting devices and techniques for convenience of illustration, equivalent embodiments could apply the same structures and techniques in any number of other settings. Indeed, the techniques described herein could be readily used to establish communications between any sorts of clients and/or servers or other nodes over any sort of network. Examples of such applications could include any sort of media streaming applications, video gaming, social networking, control or feedback applications, any sort of media sharing or storage applications, or any other application in which a client is attempting to establish a connection with a server located on a different network.

Figure 1:
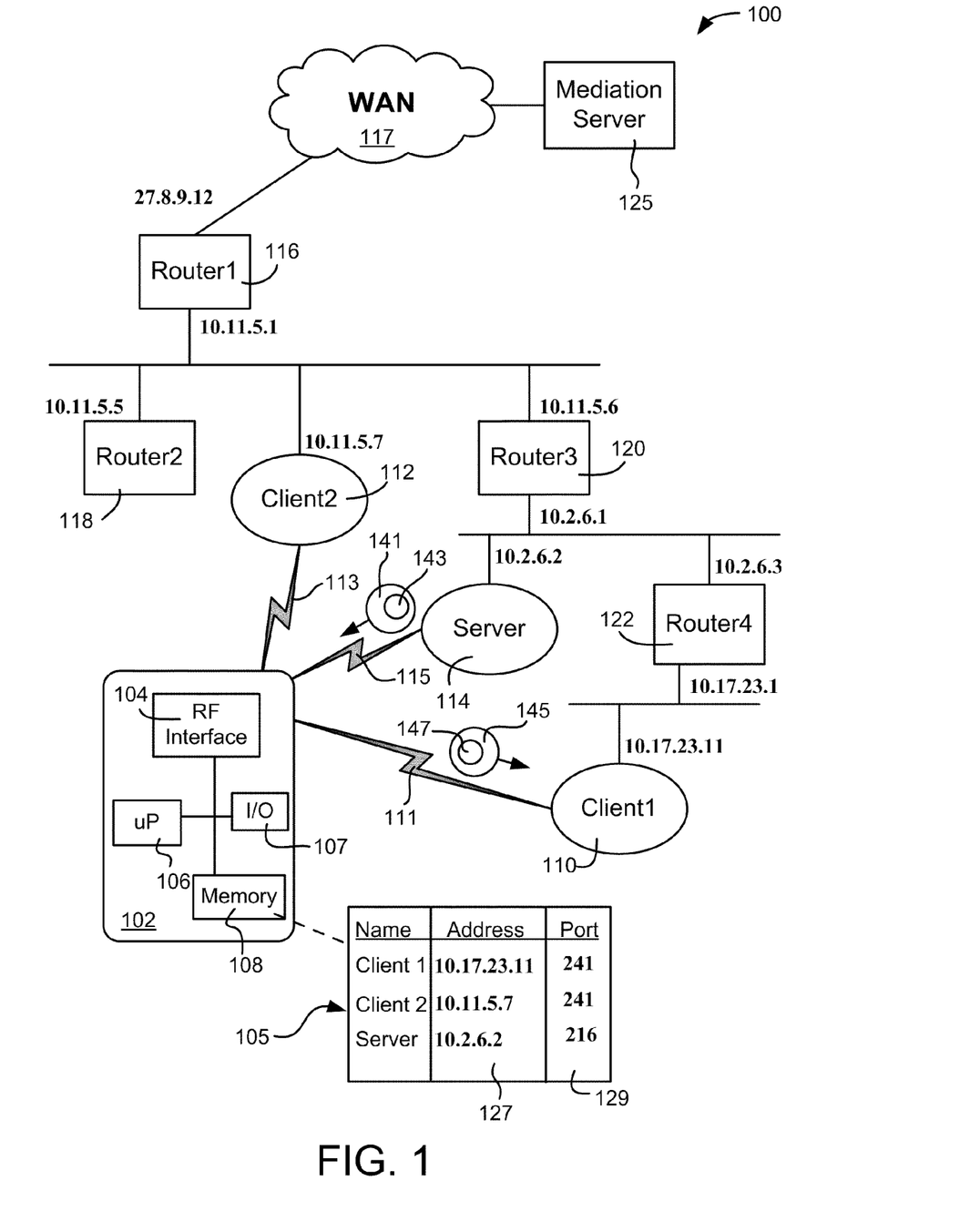
FIG. 1 is a block diagram of an exemplary system for establishing and supporting communications over a network.

Turning now to the drawing figures and with initial reference to FIG. 1, an exemplary system for establishing a connection between one or more clients 110, 112, servers 114 and/or other devices over a network 100 suitably includes an intermediating device 102 that is able to establish wireless communications sessions 111, 113, 115 with two or more devices 110, 112, 114 (respectively) that communicate on network 100. These wireless communications sessions 111, 113, 115 allow intermediating device 102 to receive network address information 105 from at least one of the devices communicating on network 100 and to transfer the received information to other devices, thereby allowing the devices to establish communications over the network. Wireless communications sessions 111, 113, 115 may be established using channels that are separate from network 100, such as any sort of radio frequency (RF) or other wireless connection. By using intermediating device 102 to transfer network address information 105 between devices 110, 112, 114 using extra-network channels, connections over network 100 may be established even when devices are unable to discover each other on the network or to establish connections through a known intermediary.

The exemplary network 100 shown in FIG. 1 shows several different networks that are all interconnected using a series of routers 116, 118, 120, 122. In the embodiment shown, router 116 connects a series of local area networks (LANs) to a wide area network (WAN) 117. WAN 117 may represent the Internet in some embodiments, and/or any other public, private, telephone or other network system based upon any set of protocols. The various LANs behind router 116 show one example of a network arrangement that could represent any series of networks implemented within a home, office, campus, neighborhood or any other environment. Other embodiments may include additional routers or fewer routers than the example of FIG. 1, and other networks may be arranged in any other topology or architecture. "Routers" as described herein may represent any device that is capable of interconnecting two or more networks, including any sort of conventional network router devices available from any number of commercial sources, as well as any sort of gateway, firewall, network switch, wireless access point, bridge and/or the like.

Clients 110, 112 and server 114 are any sort of conventional network nodes capable of communicating on network 100. In various embodiments, clients 110 and 112 attempt to contact server 114 to provide data or services, as appropriate. To use media placeshifting as an example, clients 110 and 112 may be media players that would attempt to contact a placeshifting server 114 to obtain a stream of placeshifted media content over network 100. In this example, clients 110, 112 may be implemented using any sort of network client device, such as any sort of computer system, mobile phone, personal digital assistant, network-enabled display, network-enabled television and/or the like. Server 114 in this placeshifting example may be implemented with any device capable of providing the requested media stream, such as any sort of dedicated placeshifting device, or any sort of set-top box (STB), television receiver, computer system or the like that provides media placeshifting services. Examples of conventional placeshifting functions, features, systems and structures are described in United States Patent Publication No. 2006/0095471, although the features described herein could be equivalently applied with any number of other techniques and structures in addition to those described in that particular publication. In other embodiments, clients 110, 112 and/or server 114 may attempt to contact each other for any other purposes other than placeshifting. Again, both clients 110, 112 and server 114 could represent any sort of conventional network nodes communicating on any sort of LAN, WAN or other network 100.

To establish a connection between devices on network 100, the sending device typically needs to know an address associated with the receiving device. If both devices reside on the same LAN, the devices can often discover each other with a simple LAN broadcast. If the communicating devices reside on different networks, however, broadcast techniques are significantly less effective. For client 110 to establish a connection to server 114 in FIG. 1, for example, packets from client 110 would typically need to be routed through router 122. Similarly, communications from client 112 to server 114 in FIG. 1 would typically traverse router 120. If clients 110 and 112 do not know a destination address for server 114, such communications would be very difficult to establish.

In some situations, connections can be established if the address information associated with server 114 is available from a registry that is available to clients 110 and 112. If server 114 happens to be registered with a domain name service (DNS), for example, clients 110, 112 can obtain address information using conventional techniques. DNS registry is not practical in all cases, however, especially for consumer devices that are intended to provide simple installation for even relatively unsophisticated consumers.

Often, clients 110, 112 and servers 114 may be able to establish connections with each other using a mediation server 125 or a similar intermediary service available within network 100. Mediation server 125 may be accessible across WAN 117, for example. When mediation server 125 is available, clients 110, 112 and server 114 contact the mediation server 125 at a well-known uniform resource locator (URL) or other address and provide their address information to the server using the user datagram protocol (UDP) or another appropriate protocol that can be routed on network 100. When a client 110, 112 later requests a connection to a server 114 that is in communication with the mediation server 125, the client and server can often simply exchange UDP (or other) parameters and continue communicating. This technique is commonly referred to as "UDP hole punching", and is often based upon conventional or proprietary network address translation (NAT) techniques. Such techniques are often unsuccessful, however, particularly when the client 112 and server 114 are separated by a relatively sophisticated firewall (e.g., a firewall associated with router 116). Additionally, mediation server 125 would not be available if no connection to WAN 117 was available. Even further, various types of mediation servers 125 may see the same address (e.g., 27.8.9.12 in the example of FIG. 1) for contacting client 110, client 112 and server 114, even though these devices are each located on different networks. Since all of clients 110, 112 and server 114 would be accessible to the mediation server 125 at the same effective address, this common address would be of little use in routing communications in the networks that are located on the opposite side of router 116 in this example.

Address information may nevertheless be obtained through the use of an intermediating device 102 that is able to obtain and provide address information for one or more nodes using channels that are separate from network 100. To that end, intermediating device 102 is any sort of device that is capable of establishing a wireless communications session 111, 113, 115 with one or more nodes 110, 112, 114 (respectively) communicating on network 110, and of sharing network address information between nodes 110, 112 and/or 114. Intermediating device 102 may be a remote control or other portable device, for example, that is able to communicate with clients 110, 112 and/or server 114 using RF or other wireless communications technologies.

As shown in FIG. 1, intermediating device 102 suitably includes any sort of conventional hardware, such as any sort of RF or other wireless communications interface 104, processor 106, memory 108 and input/output device 107. Generally speaking, device 102 performs its various tasks in response to software or firmware instructions that may be stored in memory 108 and executed by processor 106. Intermediating device 102 may perform any other functions in addition to those described herein. A remote control, for example, could provide RF, infrared or other wireless instructions via interface 104 in response to user inputs received via buttons or other features associated with input device 107. Such a remote control could be associated with a STB or other television receiver that also acts as a server 114 (e.g., for file sharing and/or placeshifting features) on network 100 in some implementations. Other types of devices (e.g., mobile phones, personal digital assistants, video game players, or the like) could similarly act as an intermediary for transferring address information 105 between devices communicating on network 100.

Communications interface 104 may provide any sort of infrared, radio frequency and/or other wireless transmission and reception capabilities as desired. In an exemplary embodiment, intermediating device 102 communicates using the IEEE 802.15.4 ("ZIGBEE") protocol for wireless personal area networks (WPANs), although other embodiments may alternatively or additionally communicate using IEEE 802.15.1 ("BLUETOOTH"), IEEE 802.11 (wireless local area network (WLAN) or "WI-FI"), conventional infrared, and/or any other wireless techniques. In some embodiments, intermediating device 102 may be able to support multiple types of wireless communications, such as ZIGBEE communications and also infrared communications. This feature may be useful when intermediating device 102 is a so-called universal remote that is able to provide input signals to multiple types of devices.

In many embodiments, wireless connections 111, 113, 115 can be established with one or more nodes 110, 112, 114 separately from network 100. That is, network 100 is not necessarily used to support communications 111, 113, 115 with intermediating device 102. To that end, communications 111, 113, 115 may be established using ad hoc or other networking techniques apart from network 100, such as any WPAN, ZIGBEE, BLUETOOTH, infrared, WI-FI or other techniques.

Intermediating device 102 obtains and shares address information between nodes 110, 112, 114 in any manner. After a wireless communications session is established with one or more nodes, the node typically provides address information in any suitable format and in accordance with any acceptable protocols. In the exemplary embodiment shown in FIG. 1, the intermediating device 102 receives a message 141 from one or more devices 110, 112, 114 that includes a payload 143 that provides the network address information used by the node to communicate on network 100. Intermediating device 102 also provides messages 145 with payloads 147 that provide network address information to one or more nodes 110, 112, 114, as appropriate. Messages 141 and 145 may be formatted in accordance with any standard or proprietary protocols or formats, such as conventional IEEE 802.15.1, IEEE 802.15.4 and/or IEEE 802.11 formats.

Address information refers to any information that can be used to locate a device or service on network 100. Such information may include, for example, an internet protocol (IP) address or the like. Address information may also include an IP or similar port number associated with a daemon, process or other service running within the node that is capable of accepting communications on network 100. Other embodiments may support address formats of different types and protocols, including protocols other than TCP/IP. Although some types of messages 141 and 145 may include any addresses or other identifiers used to support communications on sessions 111, 113, 115, the address information contained in the payloads 143, 147 of these messages 141, 145 will typically be used to support communications on network 100 rather than direct communications between the nodes 110, 112, 114 and intermediating device 102. Stated another way, the address information provided via payloads 143, 147 will typically be different than the addresses used to support communications on links 111, 113, 115, as appropriate.

Address information for one or more nodes 110, 112, 114 may be stored in memory 108 of intermediating device 102 in any manner. In the exemplary embodiment shown in FIG. 1, address information is shown as a table 105 that provides the network address 127 and/or port number 129 for one or more nodes. Although table 105 shows address information for three nodes 110, 112, 114, other embodiments may store address information for any number of nodes, including a single node. Other embodiments may store address information for only server nodes 114, for only client nodes 110, 112, and/or for nodes having any other criteria (e.g., only nodes providing certain services, or the like). Additional information (e.g., node name, services available via the node, or any other information) may also be obtained, stored in memory 108 and/or shared by intermediating device 102, as desired.

Address information 105 stored by intermediating device 102 may be timed out as desired to prevent sharing of outdated information. Some embodiments may additionally refresh the information in table 105 on any regular or irregular temporal basis. Refreshing may take place by polling the available devices, or in any other manner.

In practice, then, intermediating device 102 is able to establish wireless communications sessions 111, 113, 115 with one or more nodes 110, 112, 114 to facilitate sharing of network address information even when such information cannot be conveniently transferred through network 100. By obtaining address information from a server 114 and then providing address information to a client 110 using wireless communications sessions 115 and 111, for example, intermediating device 102 is able to allow client 110 to contact server 114 via network 100. This transfer of address information may take place even when WAN 117 is unavailable, without regard to the intervening topology of network 100, and without a priori knowledge of server 114 by the client 110.

Figure 2:
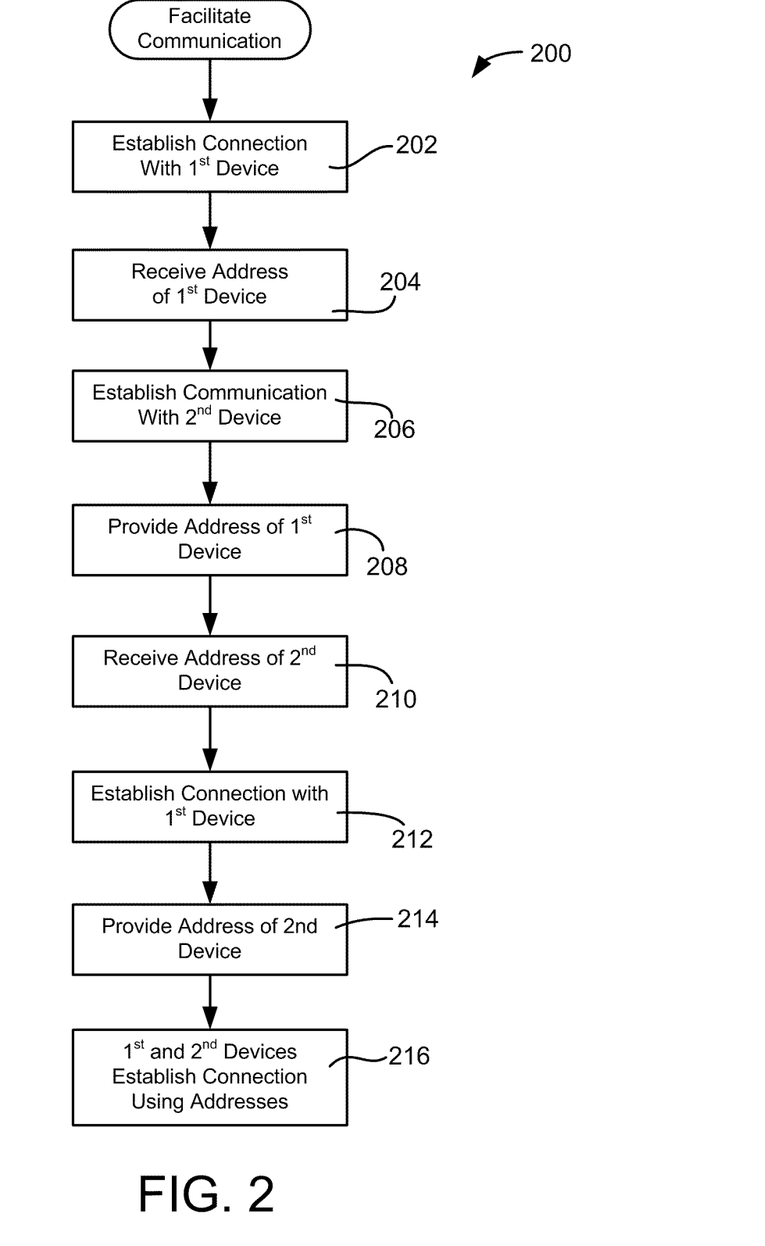
FIG. 2 is a flowchart of an exemplary process for facilitating communications between a two devices.

Turning now to FIG. 2, an exemplary method 200 for facilitating communications between a first device (e.g., server 114) and a second device (e.g., client 110 or client 112) suitably includes the broad functions of establishing a first communication session with the first device (function 202), receiving address information used by the first device to communication on a network 100 using the first communication session (function 204), establishing a second communication session with the second device (function 206), and providing the address information of the first device to the second device using the second communication session (function 208). Address information about the second device may be similarly provided back to the first device as appropriate (functions 210, 212, 214). The two nodes are then able to establish a connection over network 100 and communicate as desired (function 216). Other embodiments may omit one or more functions, may provide additional and/or alternate functions, may organize the various functions shown in FIG. 3 into different logical groups, and/or may execute the various functions in any other temporal order other than that shown in FIG. 3.

In various embodiments, the functions of method 200 are performed by processing circuitry and logic within a remote control or other intermediating device 102 that is able to communicate with the first and second devices using RF, infrared or other wireless communications that are not part of network 100. While the discussion herein often refers to an exemplary implementation in which an address of a server 114 is received and provided to a client 110, 112 for convenience, other embodiments could equivalently receive and provide address information between any number of clients, servers, other nodes and/or any other devices capable of communicating on the network.

Intermediating device 102 establishes wireless communications with the first device in any manner (function 202). In various embodiments, intermediating device 102 establishes a wireless communication session with a first device (e.g., server 114 in this example) using any sort of RF, infrared and/or other wireless communications based upon standard or proprietary protocols. A wireless remote control, for example, may initially establish communications with a controlled set top box, television receiver, television or display, placeshifting device and/or the like using conventional RF, infrared and/or other techniques. In one example, intermediating device 102 initially establishes IEEE 802.15.4, IEEE 802.15.1, IEEE 802.11 and/or other communications via interface 104 in accordance with published standards for those protocols. Such connections could be conventional ad hoc network connections based upon these or other protocols.

Other embodiments could use infrared or other line-of-sight communications techniques to establish communications between intermediating device 102 and other devices. In such embodiments, the intermediating device 102 typically establishes a communications session in the sense of providing infrared signals that direct the target device to respond in any appropriate manner. Wireless communications sessions (e.g., sessions 111, 113, 115 in FIG. 1) may therefore be directly established between the intermediating device 102 and one or more other devices using any sort of ad hoc or other wireless communications links.

Alternatively, intermediating device 102 could establish an IEEE 802.11 or other communication with the first device by joining a portion of network 100 that allows communication with the first device. If a router supports wireless LAN communications using WI-FI or other protocols, for example, intermediating device 102 could establish communications and/or determine addresses of one or more devices on the wireless LAN by joining the LAN itself. After joining the LAN, the intermediating device 102 could then discover other nodes using conventional LAN broadcast techniques or the like. Referring back to FIG. 1 for an example, if router 122 represented a wireless access point, then intermediating device 102 could obtain information about nodes on the 10.17.23.x network (including client 110) by joining that network and then transmitting a broadcast on the network to discover other nodes. Subsequent communications on network 10.17.23.x could then transfer address information as desired in this example. If intermediating device 102 were able to join multiple portions of network 100, then, the device 102 may be able to discover nodes on the various LANs that may not be able to discover each other through network 100. The use of even a portion of network 100 may be impractical or otherwise undesirable in some situations, but may be feasible and/or desirable in others. As a result, the particular wireless connections 111, 113, 115 established between intermediating device 102 and the other devices 110, 112, 114 may vary from embodiment to embodiment.

Connections may be initiated on any temporal basis, or according to any scheme. In various embodiments, device 102 automatically queries for any available address information whenever a new device 110, 112, 114 is encountered. Such encounters may occur in response to periodic or aperiodic polling by device 102, in response to a key press or other user input received via user input device 107, or in any other manner. In embodiments wherein intermediating device 102 is a universal remote control, for example, address information may be retrieved and/or shared when a control connection is established between the remote control and a controlled device such as a set top box, television receiver, television or other display, placeshifting device, and/or the like. In still other embodiments, address polling and/or transfer is performed in response to a user manipulating a button or other user interface feature (e.g., input device 107) on intermediating device 102.

After communications between intermediating device 102 and one or more other devices are established, then address information 105 can be received at the intermediating device 102 in any manner (function 204). In various embodiments, the address information 105 is transferred as payload data 143 in a conventional wireless communications frame or other message 141. An IP address and port number, for example, may be sent to the intermediating device 102 within a conventional IEEE 802.15.1, 802.15.4 or IEEE 802.11 communication. In other embodiments, such information is transmitted from the network device to the intermediating device using infrared or other techniques. Again, any sort of address information 105 based upon any network protocols or formats may be transferred and received at intermediating device 102 using any appropriate techniques.

Received address information 105 may be stored within the intermediating device 102 in any manner. In various embodiments, addresses 127, port numbers 129 and/or any other appropriate information may be stored as a table, array, list or other structure in memory 108. As noted above, other information such as the name of the device providing the information and/or the types of services provided or requested by the device may be stored with address information 105 as desired.

After address information 105 is obtained from one or more devices communicating on network 100, such information 105 may be shared with other devices as desired. To that end, intermediating device 102 subsequently establishes additional communications sessions 111, 113, 115 with other devices (function 206) and transfers the address information 105 (function 208) as desired. Generally speaking, the second communication session established in function 206 may be established using the same or similar techniques to those described in conjunction with function 202 above.

Address information 105 is shared between device(s) in any appropriate manner (function 208). In the exemplary embodiment illustrated in FIG. 2, address information 105 obtained from the first device is provided to the second device via the second connection. In various embodiments, the intermediating device 102 provides the address information 105 to the receiving device using standard or proprietary protocols. Such information 105 may be provided as payload data 147 in an IEEE 802.14.1, 802.14.4 and/or 802.11 frame or other message 145, for example. Alternately, the information 105 may be provided using infrared or other techniques, as described above.

Intermediating device 102 may also receive address information from the second device as appropriate (function 210). In the exemplary embodiment of FIG. 2, the intermediating device suitably receives address information 105 from the second device using the same connection used to provide information about the first device in function 208. In some embodiments, functions 204 and 208 may be combined so that information 105 is transmitted and received from each network node communicating with intermediating device 102. That is, certain devices could provide their address information 105 to intermediating device 102 and could receive address information 105 associated with other devices from intermediating device 102 using a common communication session.

In various embodiments, address information 105 from the second device is also provided to the first device via intermediating device 102. FIG. 2, for example, shows that the intermediating device establishes a connection to the first device (function 212) and provides the address information 105 relating to the second device to the first device (function 214), as appropriate. Address information 105 may be provided to the first device using any of the techniques described in conjunction with function 208, or the like.

Various embodiments therefore establish the various communications sessions with the different devices in a serial, parallel or other manner. To that end, function 212 may involve establishing a new connection to the first device, re-opening the prior connection established in function 202, and/or simply reusing a connection that was previously established with the first device. In some embodiments, then, the first connection established in function 202 remains active during and/or after the second connection is established in function 206. In embodiments wherein the first connection remains active, an additional connection in function 212 may not be needed to provide address information 105 to the first device. If multiple devices are within range when an IEEE 802.14.1, 802.14.4 and/or 802.11 connection request is broadcast from the intermediating device 102, for example, device 102 may simultaneously and/or serially establish connections to multiple devices. Various embodiments may therefore permit multiple simultaneous connections between intermediating device 102 and any number of other devices. To that end, functions 202, 206 and/or 212 (as well as the other functions shown) may occur simultaneously or in different temporal order from that shown in FIG. 2.

After address information is delivered to the sending and receiving devices, a communications connection between the two devices may be established in any manner (function 216). In various embodiments, standard or proprietary network address translation (NAT) techniques may be used to establish the connection. In such embodiments, each device attempts to connect to the other device using the obtained address information 105 so that subsequent communications over network 100 can occur.

Generally speaking, the various steps of method 200 may be carried out with any sort of hardware, software and/or firmware logic within intermediating device 102. Method 200 may be carried out, for example, by a remote control or other intermediating device 102 that communicates with any appropriate clients 110, 112, server(s) 114 and/or other devices communicating on network 100. In various embodiments, the functions of method 300 are carried out in response to software or firmware instructions stored in a memory (e.g., memory 108), or on a disk drive and/or other storage associated with intermediating device 102. Such instructions may be executed by any processor (e.g., processor 106) or the like. The particular means used to implement each of the various functions shown in FIG. 2, then, could be any sort of processing hardware executing conventional software or firmware logic that implements any of the processes, routines or other functions described herein.

New systems, apparatus and methods to establish connections over a digital network using an intermediating device have therefore been described. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

The term "exemplary" is used herein to represent one example, instance or illustration that may have any number of alternates. Any implementation described herein as exemplary is not necessarily to be construed as preferred or advantageous over other implementations.

What is claimed is:

1. A method executable by an intermediating device to facilitate communication between a first device and a second device on a network, wherein the network is an internet protocol (IP) network, the method comprising:
  establishing a first ad hoc wireless communication session between the first device and the intermediating device, wherein the first ad hoc wireless communication session is separate from the network;
  receiving a message from the first device at the intermediating device via the first ad hoc wireless communications session, wherein the message has a payload specifying a first address, wherein the first address is an IP network address used by the first device to communicate on the IP network;
  establishing a second ad hoc wireless communication session between the intermediating device and a second device, wherein the second ad hoc wireless communication session is separate from the first ad hoc communication session and from the network; and
  transferring the first address of the first device from the intermediating device to the second device via the second ad hoc wireless communication session thereby allow the second device to locate the first device on the IP network and to communicate with the first device via the IP network using the first address.

2. The method of claim 1 wherein the first and second ad hoc wireless communication sessions are implemented using radio frequency communications establishing direct communications between the intermediating device and the first and second devices, respectively.

3. The method of claim 2 wherein the IP network comprises at least one local area network.

4. The method of claim 1 further comprising receiving a second address from the second device via the second ad hoc wireless communication session, and providing the second address to the first device, wherein the second address is an internet protocol (IP) address.

5. The method of claim 1 further comprising storing the first address at the intermediating device until the intermediating device is transported to be in proximity with the second device so that the second ad hoc wireless communication session can be established.

6. The method of claim 4 wherein the second address is provided to the first device via the first wireless communication session.

7. The method of claim 1 wherein the first address further comprises a port number associated with the first device.

8. The method of claim 1 wherein the first ad hoc wireless communication session is established in response to a user input.

9. The method of claim 1 wherein the intermediating device is a remote control, and wherein the first and second ad hoc wireless communication sessions are bi-directional point-to-point radio frequency (RF) connections established between the remote control and the first and second devices, respectively, and wherein the first address is provided to the second device via the second point-to-point connection to thereby allow the second device to directly contact the first device via the IP network without further assistance from the intermediating device.

10. A method executable by an intermediating device to facilitate communication between a client and a server on an IP network, the method comprising:
  establishing a first ad hoc wireless communication session between the intermediating device and the server, wherein the first ad hoc wireless connection is separate from the IP network;
  receiving a first address from the server at the intermediating device via the first ad hoc wireless communication session, wherein the first address is an IP network address used by the server to communicate on the IP network;
  establishing a second ad hoc wireless communication session between the intermediating device and the client, wherein the second ad hoc wireless communication session is separate from the first ad hoc wireless communication system and the IP network; and
  transferring the first address of the server from the intermediating device to the client via the second ad hoc wireless communication session to thereby allow the client to directly communicate with the server via the IP network without further assistance from the intermediating device.

11. The method of claim 10 wherein the first and second ad hoc wireless communications sessions occur over IEEE 802.15.4 connections separate from the network.

12. The method of claim 10 wherein the first and second ad hoc wireless communications sessions occur over IEEE 802.15.1 connections separate from the network.

13. The method of claim 10 wherein the first and second ad hoc wireless communications sessions occur over IEEE 802.11 connections separate from the IP network.

14. A portable apparatus comprising:
  a radio frequency interface that communicates using ad hoc radio frequency (RF) communications; and
  a processor configured to separately establish ad hoc sessions with a first device and with a second device via the radio frequency interface, to receive a message from the first device via the RF interface that comprises a payload specifying an IP network address used by the first device to communicate on an IP network that is separate from the ad hoc RF communications, to subsequently communicate with a second device via the radio frequency interface, and to transfer the IP network address of the first device to the second device via the radio frequency interface to thereby allow the second device to locate the first device on the IP network separate from the RF channel using the IP network address provided by the portable apparatus.

15. The portable apparatus of claim 14 wherein the processor is further configured to receive a second IP network address from the second device and to transfer the second IP network address to the first device via the RF interface, wherein the second IP network address is used by the second device to communicate on the IP network.

16. The portable apparatus of claim 14 wherein the network address comprises a port number used by the first device to communicate on the IP network.

17. The portable apparatus of claim 14 further comprising a user input device, and wherein the processor is further configured to establish the first wireless communication session in response to an input received at the user input device.

18. The portable apparatus of claim 14 wherein the IP network address of the first device that is provided from the portable apparatus to the second device allows the second device to communicate directly with the first device via the IP network without further involvement by the portable apparatus.

* * * * *